United States Patent
Li et al.

(10) Patent No.: US 11,815,423 B1
(45) Date of Patent: Nov. 14, 2023

(54) PISTON PRESS SYSTEM AND TEST METHOD FOR PREDICTING ROLL SERVICE LIFE OF HIGH-PRESSURE GRINDING ROLLS

(71) Applicants: Northeastern University, Liaoning (CN); Liaoning Wuhuan Special Materials and Intelligent Equipment Industry Technology Research Institute Co. Ltd., Liaoning (CN)

(72) Inventors: Lixia Li, Liaoning (CN); Nan Li, Liaoning (CN); Zhe Liu, Liaoning (CN); Qiang Zhang, Liaoning (CN); Junfei Zhang, Liaoning (CN); Qingyu Zhang, Liaoning (CN); Jiwei Lu, Liaoning (CN); Qingyou Meng, Liaoning (CN)

(73) Assignees: Northeastern University, Liaoning (CN); Liaoning Wuhuan Special Materials And Intelligent Equipment Industry Technology Research Institute Co. Ltd., Liaoning (CN)

(*) Notice: Subject to any disclaimer, the term of this patent is extended or adjusted under 35 U.S.C. 154(b) by 0 days.

(21) Appl. No.: 18/059,004

(22) Filed: Nov. 28, 2022

(30) Foreign Application Priority Data

Apr. 27, 2022 (CN) .......................... 202210448087.3

(51) Int. Cl.
*G01M 13/00* (2019.01)
*B30B 15/26* (2006.01)
*B30B 9/00* (2006.01)

(52) U.S. Cl.
CPC .............. *G01M 13/00* (2013.01); *B30B 9/00* (2013.01); *B30B 15/26* (2013.01)

(58) Field of Classification Search
None
See application file for complete search history.

(56) References Cited

FOREIGN PATENT DOCUMENTS

| CH | 627951 A5 * | 2/1982 | .............. B02C 4/38 |
|----|------------|--------|----------|
| CN | 107132140 A | 9/2017 | |
| CN | 209673584 U | 11/2019 | |
| CN | 111307635 A | 6/2020 | |
| CN | 111797534 A | 10/2020 | |

(Continued)

OTHER PUBLICATIONS

CN114354423A, IDS record, translation (Year: 2022).*
CN113432872A, IDS record, translation (Year: 2021).*
CH627951A5, translation (Year: 1982).*

*Primary Examiner* — Lina Cordero
(74) *Attorney, Agent, or Firm* — NKL Law; Allen Xue

(57) ABSTRACT

A piston press system and a test method using the same are used for predicting the roll service life of high-pressure grinding rolls. The method is based on the same comminution mechanism of inter-particle layers compression as the heavy equipment high-pressure grinding rolls to simulate the grinding process of the studded high-pressure grinding roll, realizing that the coverage area of studs accounts for 16% to 20% of the compression surface by disposing tungsten carbide upper studs and lower studs, better restoring the simulation process and effectively realizing the roll service life prediction of the heavy equipment high-pressure roller mill with a small quantity of materials.

4 Claims, 4 Drawing Sheets

(56) References Cited

FOREIGN PATENT DOCUMENTS

| | | | |
|---|---|---|---|
| CN | 113432872 | A | 9/2021 |
| CN | 114354423 | A | 4/2022 |
| JP | 2019085222 | A | 6/2019 |
| KR | 20120066292 | A | 6/2012 |

* cited by examiner

PISTON PRESS SYSTEM AND TEST METHOD FOR PREDICTING ROLL SERVICE LIFE OF HIGH-PRESSURE GRINDING ROLLS

TECHNICAL FIELD

The present disclosure relates to the technical field of testing static or dynamic balance of machines or structures, in particular to a piston press system and a test method for predicting the roll service life of high-pressure grinding rolls.

BACKGROUND

High-pressure grinding rolls is a high-end mine equipment in recent years. Compared with other comminution plants, its unique comminution mechanism of inter-particle layers compression can give full play to "deeper crush and less grind", "substitute crushing for grinding" and "selective liberation of minerals". At present, the high-pressure grinding rolls are developing in the direction of intelligentization and large scale.

At present, model selection of intelligent high-pressure grinding rolls at home and abroad widely adopts semi-industrial equipment of equipment enterprises for selection, and required amount of material is 5 to 10 tons. This method requires many materials, high cost and long test cycle. Although this method can be used to design specific pressure of industrial equipment, it cannot be used to select the service life of the rolls of the industrial equipment.

BGRIMM Technology Group conducted a roll surface wear test to test the mass difference of roll before and after wear, so as to predict the service life of industrial rolls. The material required in each test was 100 kg, and the tested roll was a round roll having smooth surface. Different from the studded roll surface of current industrial rolls, the predicted life is also very different. Chinese application CN107866306A discloses a roll surface of stud-type high-pressure grinding roll and production method thereof, in which the wear value of the wear sample is measured according to JB/T7705 "Test Method for Loose Abrasive Wear, Rubber Wheel Method". According to the wear value, material of the stud at different positions of the roll surface is determined. This test method measures dynamic wear, the feed material is loose material. However, the high-pressure grinding roll is quasi static pressure wear, and its feeding mode is choke feed.

At present, with continuous development of intelligent control system of stock column height, roll gap correction and hydraulic system of high-pressure grinding roll, the intelligent level of the heavy equipment is continuously improved. However, for the high-pressure grinding rolls, there is no suitable test device and test method for the prediction of the service life of roll embedded with studs at home and abroad.

SUMMARY OF THE INVENTION

According to the technical problems mentioned in the background, it's an object of the present disclosure to provide a piston press system and test method for predicting the roll service life of high-pressure grinding rolls. The present disclosure is mainly based on the same comminution mechanism of inter-particle layers compression as the heavy equipment high-pressure grinding rolls to simulate the crushing process of the stud-type high-pressure grinding rolls, to predict the roll service life of the heavy equipment high-pressure grinding rolls by using a small amount of materials.

In order to achieve the above objectives, the present disclosure provides solutions as follows:

A piston press system for predicting roll service life of high-pressure grinding rolls includes a piston press and a piston mold.

Further, the piston press includes a frame, a hydraulic piston and a computer control system. The piston mold includes a piston head, upper studs, a base, lower studs, a cavity block, a first positioning block, a second positioning block, handles, an upper pressure plate, a lower pressure plate and screw holes.

Further, the first positioning block is fixedly connected with the piston head, a plurality of cylindrical upper studs are embedded in the piston head, and the upper studs protrudes from the bottom surface of the piston head by 3 mm; a plurality of cylindrical lower studs are embedded in the base, and an upper part of the base is provided with a bulge, and the lower studs protrudes from the bulge of the base by 3 mm; the upper studs are equal to the lower studs in height.

Further, the piston head and the upper pressure plate are positioned through the first positioning block and are fixed with bolts through the screw holes. The upper pressure plate is fixedly connected with the frame. The cavity block has a through interior and is spliced with the bulge of the base. The bulge is cylindrical, having a diameter slightly smaller than the inner diameter of the cavity block, so that the cavity block is tightly connected with the base.

Further, the press material is loaded in the cavity formed by splicing the cavity block and the base. A top of the lower pressure plate is also provided with a groove for fixing the second positioning block so as to position and splice. An outer side of the cavity block is provided with handles. The second positioning block is disposed at the center of the bottom of the base, and is fixedly connected with the base. The lower pressure plate is fixedly connected with the hydraulic piston, and the hydraulic piston is externally connected with the computer control system.

The present disclosure also provides a piston press test method for predicting the roll service life of the high-pressure roller mill, including the following steps of:

Step S1: installing the piston mold into the piston press, wherein the piston head and the upper pressure plate are positioned through the first positioning block and are fixed with bolts through the screw holes, the upper pressure plate of the piston mold is fixedly connected with the frame of the piston press, the cavity block and the base are spliced together to form a cavity, the base and the lower pressure plate are spliced together through the second positioning block, the lower pressure plate is fixedly connected with the hydraulic piston of the piston press, and the hydraulic piston is externally connected with the computer control system;

Step S2: preparing test materials for the piston press test and acquiring the relevant information of the test materials for the piston press test, taking a certain amount of test materials according to the formula M=ρhs, wherein ρ represents ore bulk density of the test materials, h represents initial bed thickness, and s represents area of a bottom of the cavity block, and evenly putting the test materials into the cavity and keeping a surface of the test material flat;

Step S3: setting conditions of a loading pressure and pressing speed of the piston press test by the computer control system;

Step S4: running the piston press test through the computer control system until reaching the set pressure, stopping the hydraulic piston operation, and terminating the test to obtain a pressure-displacement curve;

Step S5: fitting the pressure-displacement curve recorded by the computer control system with a fitting equation $y=A_0+A_1\times x+A_2\times x^2+A_3\times x^3+A_4\times x^4+A_5\times x^5$, wherein $A_0, A_1, A_2, A_3, A_4$ and $A_5$ represent coefficients; and carrying out a numerical integration according to the fitting equation to obtain the required energy consumption $W_i$ of the test, and calculating specific energy consumption $E_{Si}$ of the piston press test under the conditions with the equation $$E_{Si} = \frac{W_i}{M},$$

with a unit of kWh/t;

Step S6: repeating Steps S1 to S5 under different loading pressures N, and calculating the fitting equation of the piston loading pressure and the specific energy consumption of the piston press test under the corresponding loading pressure, wherein the fitting equation is $E_s=k\times N+b$, $E_{Si}$ is the specific energy consumption, N represents the loading pressure, and b represents error, with a unit of kWh/t;

Step S7: preparing the test materials for the high-pressure grinding roll test and acquiring relevant information of the test materials for the high-pressure grinding roll test; taking the ore material to-be-tested with a mass z to carry out a high-pressure grinding roll test with different specific pressures P under the condition of a specified roll speed v; and recording the energy $w_I$ consumed by the material in the test with an equation:

$$e_{si} = \frac{w_i}{z};$$

calculating the specific energy consumption $e_{si}$ of the high-pressure grinding roll test, and fitting to obtain a numerical model of the specific pressure to the specific energy consumption of the high-pressure grinding roll test;

Step S8: obtaining, according to Steps S6 and S7, a fitting relation between the specific pressure and the piston pressure of the high-pressure grinding roll under the same specific energy consumption;

Step S9: obtaining a functional relation between the specific pressure P and a roll wear coefficient $\gamma$ of the high-pressure grinding roll;

Step S10: weighing the piston press test materials with a mass M to evenly pour into a cavity formed by splicing the piston mold cavity block and the base and making the surface smooth, setting the loading pressure as N through the computer control system, which is 0 to 250 MPa, and setting the pressing speed as V, which is 0 to 300 kN/S , and carrying out a closed-circuit piston press test;

Step S11: carrying out a particle size analysis of the material after loading pressure by using a sieve having a small mesh size, weighing the undersize material and recording the mass as $m_n$, taking the raw ore with the same mass $m_n$ to mix with the oversize material as a feedstock of a new piston press test, namely keeping the same feeding mass M for each piston press test, and carrying out the closed-circuit piston press test again with the piston press;

Step S12: repeating Step S11 until the mass of the undersize material obtained by three consecutive piston press tests tends to be stable, and measuring a height $x_1$ of the upper stud of the piston mold at this time, wherein the number of tests is n, and n=1, 2, 3, 4 . . . ;

Step S13: under the condition of a test cycle t, continuing to repeat Step S11, after completion of the test, measuring the height $x_2$ of the upper stud of the piston mold, and calculating the piston mold wear coefficient $\eta$ with the equation of $$\eta = \frac{\Delta x}{t},$$

wherein $\Delta x=x_1-x_2$ is a wear height of the upper stud of the piston mold;

Step S14: repeating Steps S10 to S13 under different loading pressures N to obtain a relation between the piston pressure and the piston mold wear coefficient under different loading pressures;

Step S15: according to the fitting relation between the specific pressure and the piston pressure of the high-pressure grinding rolls in Step S8 and the relation between the specific pressure and the roll wear coefficient $\gamma$ of the high-pressure grinding roll in Step S9, obtaining a functional relation between the roll wear coefficient $\gamma$ and the piston mold wear coefficient $\eta$ of a heavy equipment high-pressure grinding roll under the same pressure condition.

Compared with the prior art, the present disclosure has the following advantages:

The piston press system disclosed in the present disclosure forms a high wear-resistant plane similar to the studded roll surface of the heavy equipment high-pressure grinding roll by means of installing studs on the piston head and the compression surface of the base, improving the service life of the piston mold and providing a method for measuring the wear of studded roll surface. The disclosed piston press test method simplifies the test process for measuring the wear of roll surface of high-pressure grinding rolls, and provides a guidance for the roll service life prediction of high-pressure grinding rolls.

DETAILED DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

Figure 1:
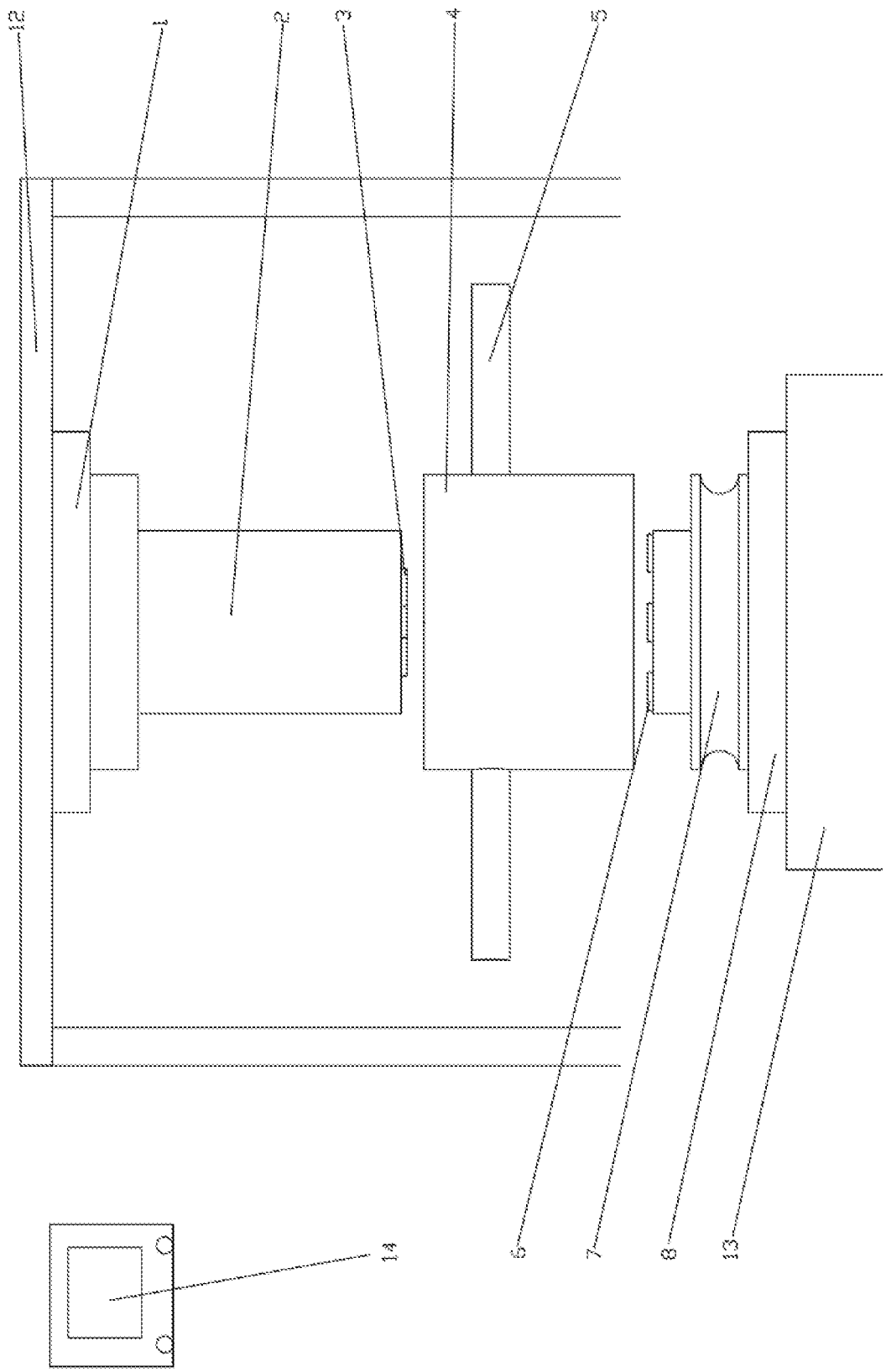
FIG. 1 is a front view of the piston press system of the present disclosure.

In the figures, 1. upper pressure plate, 2. piston head, 3. upper stud, 4. cavity block, 5. handle, 6.

lower stud, 7. base, 8. lower pressure plate, 9. first positioning block, 10. second positioning block, 11. screw hole, 12. frame, 13. hydraulic piston, 14. computer control system.

DETAILED DESCRIPTION OF PREFERRED EMBODIMENTS

To enable the personnel in the technical field better understand the solution of the present disclosure, the following clearly and completely describes the technical solutions in the embodiments of the present disclosure in combination with the accompanying drawings in the embodiments of the present disclosure. Apparently, the described embodiments are merely some rather than all of the embodiments. Based on the embodiments of the present disclosure, all the other embodiments obtained by those of ordinary skill in the art without inventive effort are within the protection scope of the present disclosure.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those of ordinary skill in the art without inventive effort are within the protection scope of the present disclosure.

It should be noted that the terms used herein are only intended to describe specific implementations and are not intended to limit the exemplary implementations of the present disclosure. As used herein, unless indicated obviously in the context, a singular form is intended to include a plural form. Furthermore, it should be further understood that the terms "include" and/or "comprise" used in this specification specify the presence of features, steps, operations, devices, components and/or of combinations thereof.

Unless specifically stated otherwise, the relative arrangement of components and steps, numerical expressions, and numerical values set forth in these embodiments do not limit the scope of the present disclosure. In addition, it should be clear that, for ease of description, sizes of the various components shown in the accompanying drawings are not drawn according to actual proportional relations. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present disclosure, it should be noted that orientations or position relations indicated by orientation terms "front, rear, upper, lower, left, and right", "transverse, vertical, perpendicular, and horizontal", "top and bottom", and the like are usually based on orientations or position relations shown in the accompanying drawings, and these terms are only used to facilitate description of the present disclosure and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present invention: orientation words "inner and outer" refer to the inside and outside relative to the contour of each component.

For ease of description, spatially relative terms such as "on", "over", "on the upper surface", and "above" can be used here, to describe a spatial positional relation between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotates by 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present disclosure.

Embodiment 1

Figure 4:
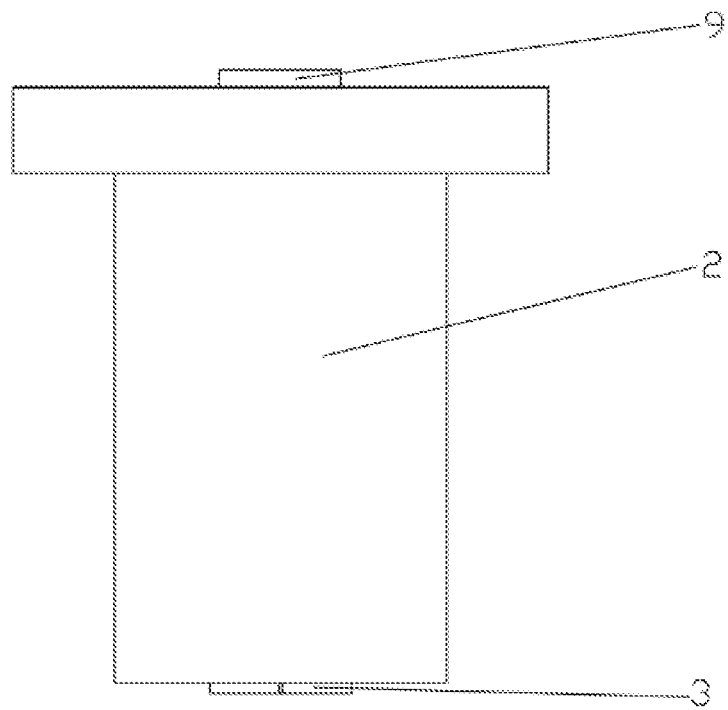
FIG. 4 is a left view of the piston head of the present disclosure.
Figure 5:
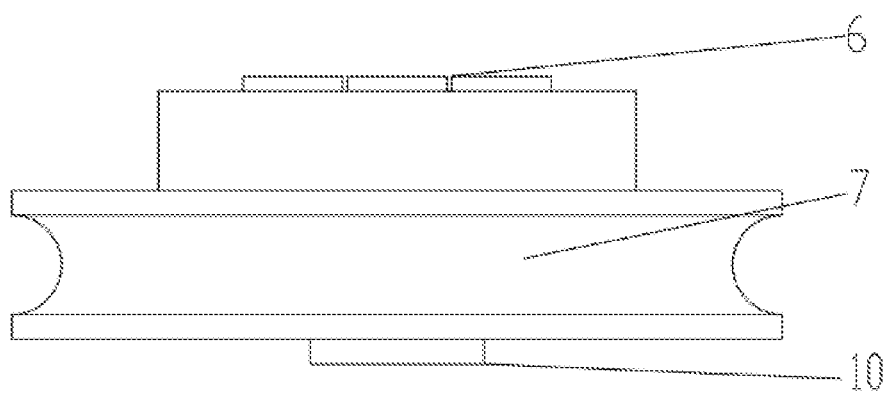
FIG. 5 is a left view of the base of the present disclosure.

As shown in FIG. 1, FIG. 4 and FIG. 5, this embodiment provides a piston press system for predicting roll service life of high-pressure grinding rolls, including a piston press and a piston mold. The piston mold includes a piston head 2, upper studs 3, a base 7, lower studs 6, a cavity 4, a first positioning block 9, a second positioning block 10, handles 5, screw holes 11 (see FIG. 2), an upper pressure plate 1 and a lower pressure plate 8. The piston press includes a frame 12, a hydraulic piston 13 and a computer control system 14.

The first positioning block 9 is fixedly connected with the piston head 2. The piston head 2 and the upper pressure plate 1 are positioned through the first positioning block 9 and are fixed with bolts through the screw holes 11. The upper pressure plate 1 is fixedly connected with the frame 12. The outer side of the cylindrical cavity block 4 is provided with handles 5 in threaded connection with the cavity block 4. The cavity block 4 has a through interior and is spliced with the base 7. The press material is loaded in the cavity formed by splicing the cavity block 4 and the base 7. The top of the lower pressure plate 8 is also provided with a groove for fixing the second positioning block 10 so as to position and splice. The second positioning block 10 is disposed at the center of the bottom of the base 7, and is fixedly connected with the base 7. As a preferred implementation, in this invention, the upper pressure plate 1 is the same as the lower pressure plate 8, which is provided with a groove at the middle, and the cylindrical first positioning block 9 at the top of the piston head is directly inserted into the groove of the upper pressure plate 1 to play a positioning role.

When pressure loading is completed, the press materials are closely connected due to high pressure. When the materials need to be removed, the base 7 and the cavity block 4 can be disassembled as a whole through the handles 5, and the whole may be moved to a position convenient for cleaning, so as to conveniently unload ore and ensure the overall system cleanness. The lower pressure plate 8 is fixedly connected with the hydraulic piston 13, and the hydraulic piston 13 is externally connected with the computer control system 14. The computer control system 14 includes a displacement sensor and a stress loader, and the displacement data and stress data in the process of the test can be directly obtained through the computer control system 14.

Figure 2:
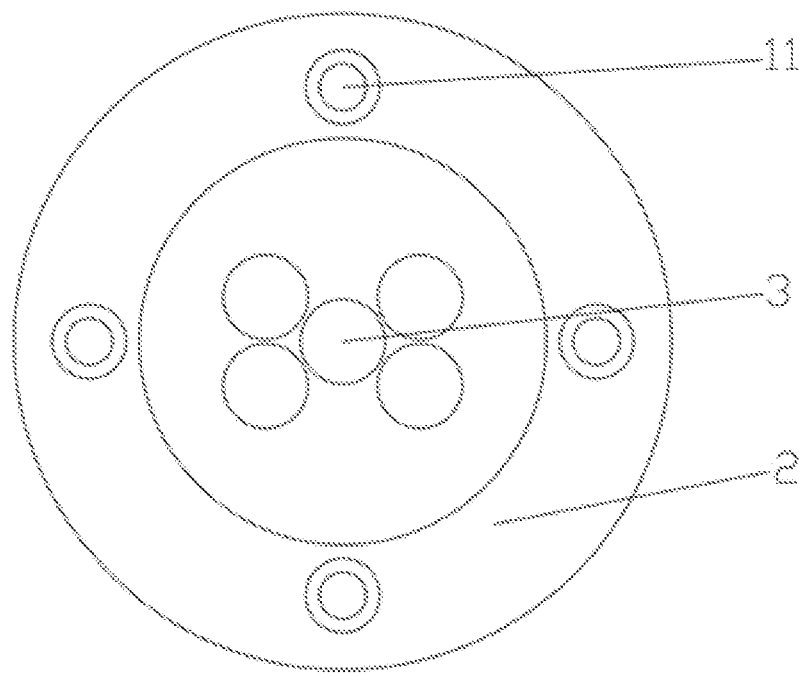
FIG. 2 is a top view of the piston head of the present disclosure.
Figure 3:
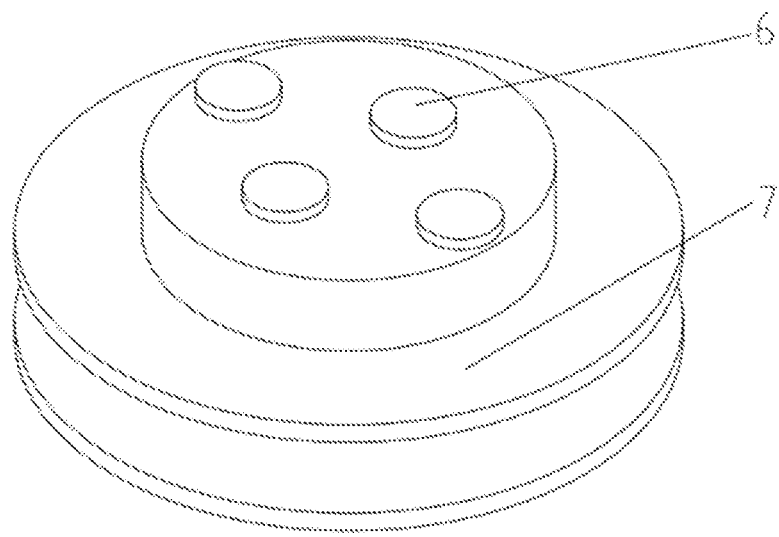
FIG. 3 is an isometric view of the base of the present disclosure.

As shown in FIG. 2 and FIG. 3, a plurality of cylindrical upper studs 3 are embedded in the piston head 2, and the upper studs 3 protrudes from the bottom surface of the piston head 2 by 3 mm; and a plurality of cylindrical lower studs 6 are embedded in the base 7, and an upper part of the base 7 is provided with a bulge, and the lower studs 6 protrudes from the bulge of the base 7 by 3 mm. The upper studs 3 are equal to the lower studs 6 in height. The upper studs 3 and the lower studs 6 are a stagger arrangement, forming a high wear-resistant plane similar to the studded roll surface of the heavy equipment high-pressure grinding rolls. As a preferred implementation, in this invention, a total height of the bulge and the base is 40 mm, and a height of the lower studs is 30 mm.

Figure 6:
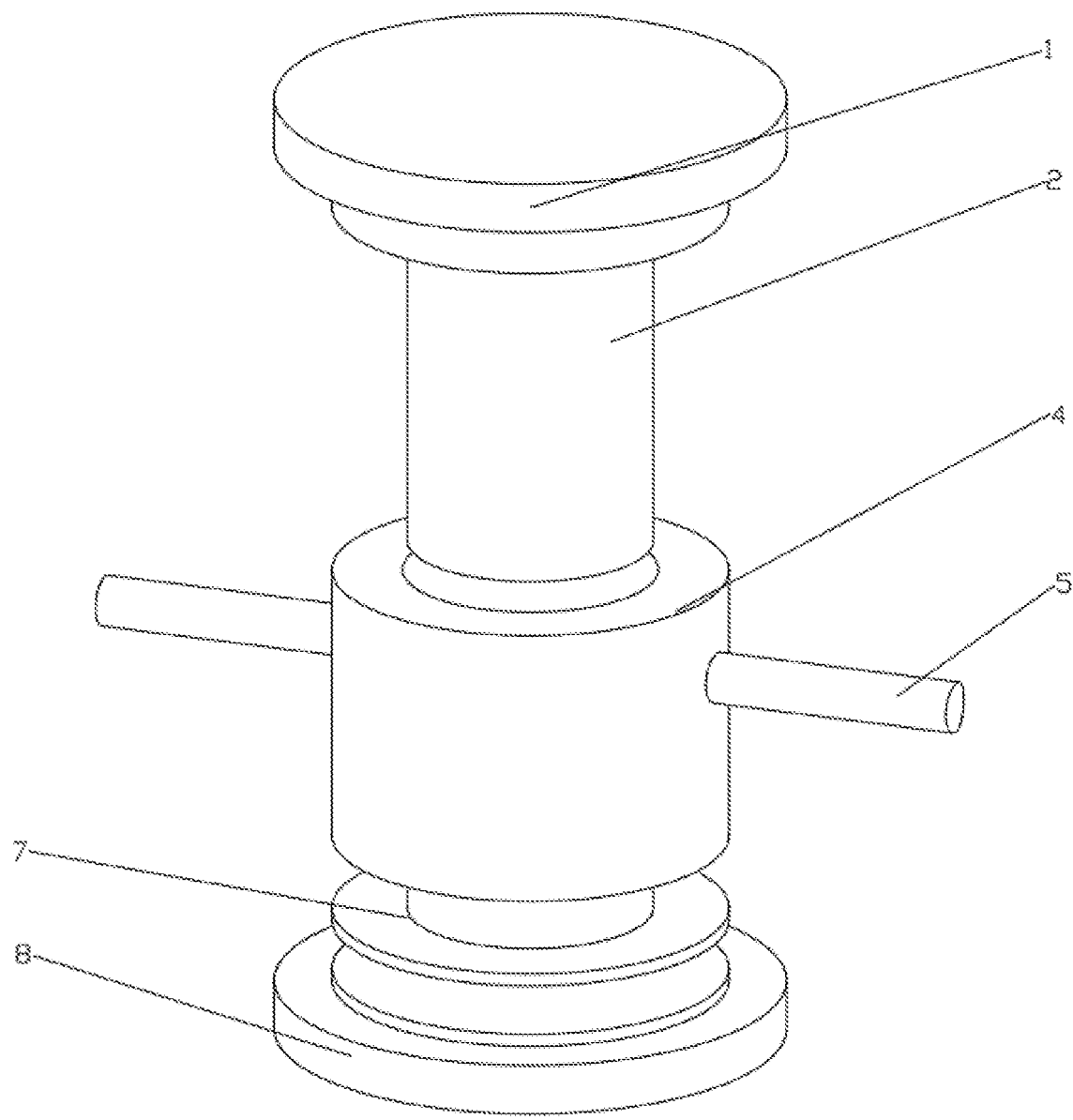
FIG. 6 is an isometric view of the piston mold of the present disclosure.

As shown in FIG. 6, the cavity block 4 has a through interior and is spliced with the bulge. The bulge is cylindrical, having a diameter slightly smaller than the inner diameter of the cavity block 4, so that the cavity block 4 is tightly connected with the base 7, avoiding the materials flow out of the gap between the cavity block 4 and the base 7 in the pressure loading process.

As a preferred implementation, in this invention, the pressure provided by the piston press is 0 to 250 MPa. The cavity block 4, the piston head 2 and the base 7 are made of medium carbon alloy steel. The cavity block 4 has an inner diameter of 100 mm, a thickness of 27.5 mm and a height of 120 mm. The piston head 2 has a compression surface with a diameter of 96 mm, and has a height of 138 mm. The base 7 has a compression surface with a diameter of 96 mm, and has a height of 40 mm and a spacing of 21 mm between the adjacent studs 6 of the compression surface. The upper studs 3 and the lower studs 6 are tungsten carbide hard alloy columns, having a diameter of 20 mm, a protruding height of 3 mm and an embedded depth of 27 mm, and the studs cover area accounts for 16% to 20% of the compression surface.

Embodiment 2

A piston press test method for predicting roll service life of the high-pressure grinding rolls, taking a certain magnetite as an example, includes the following test steps:

As shown in FIG. 1, FIG. 4 and FIG. 5, Step S1: the piston mold is installed into the piston press. The piston head 2 and the upper pressure plate 1 are positioned through the first positioning block 9 and are fixed with bolts through the screw holes 11, and the upper pressure plate 1 of the piston mold is fixedly connected with the frame 12 of the piston press. The cavity block 4 and the base 7 are spliced together to form a cavity, and the base 7 and the lower pressure plate 8 are spliced together through the second positioning block 10. The lower pressure plate 8 is fixedly connected with the hydraulic piston 13 of the piston press, and the hydraulic piston 13 is externally connected with the computer control system 14.

Step S2: A jaw crusher is used to crush the ore until 95% of the ore pass through a 12 mm sieve. The crushed ore is used as test materials of the piston press test. The measured bulk density of the ore is 1.9 g/cm$^3$, the initial bed thickness is 6 cm, the bottom area of the cavity is 78.54 cm$^2$, and the mass of the ore material required for the test is 895.4 g calculated according to the equation M=ρhs. 895.4 g of the ore materials are weighed by a balance and are evenly put into the cavity formed by splicing the piston mold cavity block 4 and the base 7, and make the surface flat.

Step S3: The piston press test procedure is opened, through the control panel of the computer control system 14, to create a new test item. Conditions of the loading pressure and the pressing speed of the piston press test are set. The pressing speed V is set as 0 to 300 kN/S. The piston press tests are respectively carried out with different loading pressures N, and N is 0 to 250 MPa.

Step S4: The hydraulic piston 13 of the piston press is started to move upward by means of the piston press test procedure, so that the hydraulic piston 13 drives the lower pressure plate 8 and the combination formed by the base 7 and the cavity block 4 to move upward to enable the piston head 2 to insert the cavity block 4. When the piston head 2 contacts the ore materials, the pressure showed on the control panel of the computer control system 14 will be slightly greater than 0, and then close the hydraulic piston 13 to stop the operation. The displacement is set as 0 through the control panel of the computer control system 14. At this time, the created piston press test item in Step S3 is started. The hydraulic piston 13 continues to drive the lower pressure plate 8 and the combination of the base 7 and the cavity 4 to move upward at the set pressing speed to load pressure to the ore materials. When the pressure reaches 2 kN, the computer control system 14 starts to record the real time date of pressure and displacement during the test process, and forms a force to displacement curve until the set pressure is reached, and the running of the hydraulic piston 13 is stopped to terminate the test. The hydraulic piston 13 is started again to move downward by means of the piston press test procedure, so that the hydraulic piston 13 drives the lower pressure plate 8, the base 7 and the cavity block 4 to move downward, and the piston head 2 leaves the cavity block 4. The combination of cavity block 4 and base 7 is taken down from the lower pressure plate 8 and the cavity block 4 and base 7 are separated to unload the materials.

Step S5: Taking the pressing speed of 200 kN/S and the loading pressure of 25.5 MPa as an example, the force to displacement curve recorded by the computer control system 14 is fitted, and the fitting equation is $y=A_0+A_1\times x+A_2\times x^2+A_3\times x^3+A_4\times x^4+A_5\times x^5$, wherein $A_0=-22432.59$, $A_1$32 $-1.33$, $A_2=-2.79$, $A_3=3.1$, $A_4=-1.55$ and $A_5=3.22$ The energy consumption Wi required by the test is obtained by a numerical integration of this equation, and the specific energy consumption of the piston press test is 0.336 kWh/t calculated through the equation $$E_{Si} = \frac{W_i}{M}.$$

Step S6: Under condition of the pressing speed of 200 kN/S, Steps S1 to S5 are repeated to respectively carry out the piston press test with different loading pressures N of 50.9 MPa, 76.4 MPa, 101.9 MPa, 127.3 MPa, 152.8 MPa, and the specific energy consumptions of the piston press test corresponding to the loading pressures are 0.56 kWh/t, 0.8 kWh/t, 1.2 kWh/t, 1.4 kWh/t, 1.6 kWh/t. The piston press tests under condition of the pressing speed of 200 kN/S show that the piston pressure is proportional to the specific energy consumption, and the fitting equation is $E_{si}=0.0105 \times N+0.0542$, with a unit of kWh/t.

Step S7: The same kind of ore is taken and crushed by a jaw crusher until 95% of the ore pass through a 30 mm sieve. The crushed ore is used as the test materials of the high-pressure grinding roll test, i.e., −30 mm materials. WGM-6020 high-pressure grinding roll is used for test, and the mass of the material in each test is 200 kg. The roll speed v, ranging from 0 to 2 m/s, is set by the computer control system of the high-pressure grinding roll. The ore materials to-be-tested are subject to high-pressure grinding roll test with different specific pressures P at set roll speed v, and the specific pressure P is 3 N/mm², 4 N/mm² and 5 N/mm², respectively. The energies $w_i$ consumed by the materials during the test are recorded. The specific energy consumption of the high-pressure grinding roll test is calculated according to the equation $$e_{si} = \frac{w_i}{z},$$

and $e_{si}$ is 1.61 kWh/t, 2.10 kWh/t and 2.40 kWh/t, respectively. The numerical model of the specific pressure to the specific energy consumption of the high-pressure grinding roll test is obtained to be $e_s=0.395 \times P+0.457$ by fitting, with a unit is kWh/t.

Step S8: According to Steps S6 and S7, a fitting relation between the specific pressure and the piston pressure of the high-pressure grinding roll under the same specific energy consumption is obtained to be $N=37.62P+38.36$.

Step S9: The test time is set as t, ranging from 6000 to 8000 hours, and the roll speed is set as v, ranging from 0 to 2 m/s. Under conditions of the specific pressures of 2.5 N/mm², 3.4 N/mm² and 4.8 N/mm² respectively, the −30 mm ore materials in Step S7 are taken and carried out the high-pressure grinding roll test by using the WGM-6020 high-pressure grinding roll. For the studded roll surface of the high-pressure grinding roll, the height difference Δg of stud protruding from the roll surface before and after the test is measured, so that the roll wear coefficient γ is obtained according to equation $\gamma=\Delta g/t$, and γ is about 0.00111 mm/h, 0.00177 mm/h and 0.00283 mm/h, respectively. The functional relation between the specific pressure and the roll wear coefficient γ of the high-pressure grinding roll is $P=1335.7\gamma+1.02$.

Step S10: 895.4 g of ore materials calculated in Step S2 is weighed and evenly poured into the cavity formed by splicing the piston mold cavity block 4 and the base 7, and make the material surface flat. The test procedure is started by means of the control panel of the computer control system 14 to create a new test item. The loading pressure is set as N, ranging from 0 to 250 MPa, and the pressing speed is set as V, ranging from 0 to 300 kN/S, and a 3 mm closed-circuit piston press test is carried out.

Step S11: After loading pressure, the materials are carried out a particle size analysis by using a 3 mm sieve. The undersize (−3 mm materials) is weighed, and the mass is $m_n$. The raw ore with the same mass of $m_n$ is taken to mix with the undersize, feeding as a new piston press test, namely keeping the feed mass of 895.4 g of each piston press test unchanged, and the piston press is used to carry out the 3 mm closed-circuit piston press test again.

Step S12: Step S11 is repeated until the mass of the −3 mm materials obtained by three consecutive piston press tests tends to be stable, and the number of tests is n, and n=1, 2, 3, 4 . . . . A height $x_1$ of the upper stud of the piston mold at this time is measured.

Step S13: Under the condition of the test cycle t, Step S11 is repeated to conduct the 3 mm closed-circuit piston press test, t ranging from 6000 to 8000 hours. After completion of the test, the height $x_2$ of the upper stud of the piston mold is measured, and the wear coefficient η of the piston mold is calculated with the equation $$\eta = \frac{\Delta x}{t},$$

and $\Delta x=x_1-x_2$ is a wear height of the upper stud of the piston mold.

Step S14: Steps S10 to S13 are repeated under different loading pressures N to obtain a relation between the piston pressure and the piston mold wear coefficient under different loading pressures, satisfying $N=c\eta+d$, wherein c and d are coefficients.

Step S15: According to the fitting relation between the specific pressure and the piston pressure of the high-pressure grinding roll in Step S8 and the relation between the specific pressure and the roll wear coefficient γ of the high-pressure grinding roll in Step S9, a functional relation between the roll wear coefficient γ and the piston mold wear coefficient ηo of a heavy equipment high-pressure grinding roll is obtained under the same pressure condition, satisfying $$\gamma = \frac{c \times \eta - 76.73 + d}{50249}.$$

The ordinals of the above embodiments of the present disclosure are for descriptive purposes only and do not represent good or bad of the embodiments.

In the above embodiments of the present disclosure, the description of each embodiment has its own emphasis, and the part not detailed in one embodiment can be referred to the relevant description of the other embodiments.

At last, it should be stated that the above various embodiments are only used to illustrate the technical solutions of the present disclosure without limitation; and despite reference to the aforementioned embodiments to make a detailed description of the present disclosure, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A piston press system for predicting roll service life of high-pressure grinding rolls, comprising a piston press and a piston mold, wherein
the piston press comprises a frame (12), a hydraulic piston (13) and a computer control system (14);
the piston mold comprises a piston head (2), a plurality of upper studs (3), a base (7), a plurality of lower studs (6), a cavity block (4), a first positioning block (9), a second positioning block (10), handles (5), an upper pressure plate (1), a lower pressure plate (8) and screw holes (11); wherein the first positioning block (9) is fixedly connected with the piston head (2), the plurality of upper studs (3) are embedded in the piston head (2), and the plurality of upper studs (3) protrudes from a bottom surface of the piston head (2) by 3 millimeters (mm);

the plurality of studs (6) are embedded in the base (7), an upper part of the base (7) is provided with a bulge, and the plurality of lower studs (6) protrudes from the bulge of the base (7) by 3 mm;

the plurality of upper studs (3) are equal to the plurality of lower studs in height;

the piston head (2) and the upper pressure plate (1) are positioned through the first positioning block (9) and are fixed with bolts through the screw holes (11); the upper pressure plate (1) is fixedly connected with the frame (12);

the cavity block (4) has a through interior and is spliced with the bulge of the base (7);

the bulge is cylindrical in shape, having a diameter slightly smaller than an inner diameter of the cavity block (4), so that the cavity block (4) is tightly connected with the base (7);

press materials for a piston press test are loaded in a cavity formed by splicing the cavity block (4) and the base (7); and a top of the lower pressure plate (8) is provided with a groove for fixing the second positioning block (10) so as to position and splice;

an outer side of the cavity block (4) is provided with the handles (5);

the second positioning block (10) is disposed at a center of the bottom of the base (7), and is fixedly connected with the base (7);

the lower pressure plate (8) is fixedly connected with the hydraulic piston (13), and the hydraulic piston (13) is externally connected with the computer control system (14);

wherein the computer control system (14) comprises a displacement sensor and a stress loader, and displacement data and stress data during the piston press test are obtained through the computer control system (14);

each of the displacement sensor and the stress loader is installed on the hydraulic piston (13) for data collection and transmits displacement and stress changes to the computer control system (14) by a signal line, and the computer control system (14) records the displacement data and the stress data in real-time.

2. The piston press system for predicting the roll service life of high-pressure grinding rolls according to claim 1, wherein the plurality of upper studs (3) and the plurality of lower studs (6) are a stagger arrangement.

3. The piston press system for predicting the roll service life of high-pressure grinding rolls according to claim 1, wherein the cavity block (4) is connected with the handles (5) in a threaded connection.

4. A piston press test method for predicting the roll service life of high-pressure grinding rolls with the piston press system according to claim 1, comprising following steps of:

step S1: installing the piston mold into the piston press; wherein the piston head (2) and the upper pressure plate (1) are positioned through the first positioning block (9) and are fixed with the bolts through the screw holes (11), the upper pressure plate (1) of the piston mold is fixedly connected with the frame (12) of the piston press, the cavity block (4) and the base (7) are spliced together to form the cavity, the base (7) and the lower pressure plate (8) are spliced together through the second positioning block (10), the lower pressure plate is fixedly connected with the hydraulic piston (13) of the piston press, and the hydraulic piston (13) is connected with the computer control system (14);

step S2: preparing the press materials for the piston press test and acquiring relevant information of the press materials for the piston press test, taking a certain amount of the press materials according to equation M=ρhs, evenly putting the press materials into the cavity and keeping a surface of the press materials flat, wherein ρ represents bulk density of the press materials, h represents an initial bed thickness, and s represents an area of a bottom of the cavity block (4);

step S3: setting conditions of a loading pressure N and a pressing speed V of the piston press test by the computer control system (14);

step S4: running the piston press test through the computer control system (14) until reaching the loading pressure N, stopping the hydraulic piston, and terminating the piston press test to obtain a pressure-displacement curve;

step S5: fitting the pressure-displacement curve recorded by the computer control system (14) with a fitting equation $y=A_0+A_1 \times x+A_2 \times x^2+A_3 \times x^3+A_4 \times x^4+A_5 \times x^5$, wherein $A_0$, $A_1$, $A_2$, $A_3$, $A_4$ and $A_5$ represent coefficients, and x represents a fitted variable; and carrying out a numerical integration according to the fitting equation to obtain a required energy consumption $W_i$ of the piston press test, and calculating a specific energy consumption $E_{Si}$ of the piston press test under the set conditions with equation $$E_{Si} = \frac{W_i}{M},$$

with a unit of Kilowatt-hour per piston press test (kWh/t), wherein M represents a mass of the press materials with a unit of grams (g), and i represents piston press test times;

step S6: repeating steps S1 to S5 under different loading pressures N and calculating a fitting equation of the loading pressure N and the specific energy consumption $E_S$ of the piston press test under a corresponding loading pressure N, wherein the fitting equation is $E_S=k \times N+b$, wherein $E_S$ represents the specific energy consumption with the unit of kWh/t, N represents the corresponding loading pressure N with a unit of megapascal (MPa), and k and b are coefficients which are determined according to the specific energy consumption $E_S$;

step S7: preparing the press materials for a comminution test employing high-pressure grinding rolls with the bulk density and acquiring the relevant information of the press materials for the comminution test employing high-pressure grinding rolls; taking the press materials to be tested with a mass z to carry out the comminution test employing high-pressure grinding rolls with different specific pressures P under a condition of a specified roll speed v of the comminution test employing high-pressure grinding rolls; recording the required energy consumption $w_i$ consumed by the press materials in the comminution test employing high-pressure grinding rolls, and calculating the specific energy consumption $e_{si}$ of the comminution test employing high-pressure grinding rolls for each different specific pressure P with equation:

$$e_{si} = \frac{w_i}{z};$$

fitting corresponding results to obtain a numerical model of specific pressure P to the specific energy consumption $e_{si}$ of the comminution test employing high-pressure grinding rolls;

step S8: obtaining, according to steps S6 and S7, a fitting relation between the specific pressure P and the loading pressure N of the comminution test employing high-pressure grinding rolls under same specific energy consumptions $E_s$ and $e_{si}$;

step S9: obtaining a functional relation between the specific pressure P and a roll wear coefficient $\gamma$ of a high-pressure grinding roll;

step S10: weighing the press materials with mass M to evenly pour into the cavity formed by splicing the cavity block (4) and the base (7) and making the surface of the press materials smooth, setting the loading pressure N through the computer control system (14) from 0 to 250 MPa, and setting the pressing speed V at a value from 0 to 300 kilonewton per second (kN/S), and carrying out a closed-circuit piston press test;

step S11: carrying out a particle size analysis of the press materials after applying the loading pressure N by using a sieve having a mesh size, weighing undersize press materials and recording a corresponding mass as $m_n$, taking the press materials with the mass $m_n$ to mix with oversize press materials as a feedstock of a new closed-circuit piston press test, namely keeping a same feeding mass for each closed-circuit piston press test, and carrying out the new closed-circuit piston press test again;

step S12: repeating step S11 until the mass $m_n$ of the undersize press materials obtained by three consecutive closed-circuit piston press tests tends to be similar, and measuring a height $x_1$ of one of the plurality of upper studs (3) of the piston mold, wherein a number of closed circuit piston press tests is n, and n=1, 2, 3, 4 . . . ;

step S13: under a condition of a piston press test cycle t, continuing to repeat step S11, after completion of the piston press test cycle t, measuring a height $x_2$ of the one of the plurality of upper studs (3) of the piston head (2), and calculating a piston mold wear coefficient $\eta$ with equation $$\eta = \frac{\Delta x}{t},$$

wherein $\Delta x = x_1 - x_2$ is a wear height of the one of the plurality of upper studs (3) of the piston head (2);

step S14: repeating steps S10 to S13 under the different loading pressures N to obtain a relation between the loading pressure N and the piston mold wear coefficient $\eta$—under the different loading pressures N; and step S15: according to the fitting relation between the specific pressure P and the loading pressure N of the comminution test employing high-pressure grinding rolls in step S8, and the relation between the specific pressure P and the roll wear coefficient $\gamma$ of the high-pressure grinding roll in step S9, obtaining a functional relation between the roll wear coefficient $\gamma$ and the piston mold wear coefficient $\eta$ of a high-pressure grinding roll under same conditions.

* * * * *